United States Patent

[11] 3,612,911

[72] Inventor Friedrich-Karl Kroos
Soecking, Germany
[21] Appl. No. 61,768
[22] Filed Aug. 6, 1970
[45] Patented Oct. 12, 1971
[73] Assignee Siemens Aktiengesellschaft
Munich, Germany

[54] ASYNCHRONOUS RS SWEEP STAGE IN ECL TECHNIQUE
3 Claims, 7 Drawing Figs.

[52] U.S. Cl. .......... 307/289, 307/215, 307/218, 307/290, 307/213, 328/195, 328/206
[51] Int. Cl. .......... H03k 3/26
[50] Field of Search .......... 307/289, 290, 291, 292, 218, 213, 216, 203, 215; 328/195, 196, 193, 206

[56] References Cited

UNITED STATES PATENTS

| | | | |
|---|---|---|---|
| 3,510,679 | 5/1970 | Peil | 307/215 |
| 3,514,640 | 5/1970 | Fett | 307/289 |
| 3,548,221 | 12/1970 | Hintz | 307/292 |
| 3,519,810 | 7/1970 | Priel et al. | 307/216 |

*Primary Examiner*—Stanley D. Miller, Jr.
*Assistant Examiner*—R. E. Hart
*Attorney*—Hill, Sherman, Meroni, Gross & Simpson

ABSTRACT: An asynchronous RS sweep stage in emitter-coupled technique utilizes emitter follower output circuits and a retroactive path to decrease pulse application and pulse duration time.

$R \cdot S = 1 \rightarrow Q^{*} = Q \; ; \; R \cdot S = 0 \rightarrow Q^{*} = \bar{Q}$ INVENTOR
Friedrich-Karl-Kroos BY Hill, Sherman, Meroni, Gross & Simpson ATTYS.

INVENTOR
FRIEDRICH-KARL KROOS

BY ATTORNEYS

ASYNCHRONOUS RS SWEEP STAGE IN ECL TECHNIQUE

BACKGROUND OF THE INVENTION

1. Field of the Invention

The invention relates to an asynchronous sweep stage constructed in ELC technique which has a lower signal transmission time and requires only short adjusting pulses.

2. Description of the Prior Art

Besides a subdivision into pulse-controlled and asynchronous, i.e. clock sweep circuits, bistable sweep circuits are often subdivided according to their logical behavior, i.e. according to the kind of the linkage of the input information. Only few sweep stage kinds have been technically constructed of the large number of hereby possible sweep-stage kinds which are meaningful in themselves. (Compare, for instance, "Elektronische Rechenanlagen" (1), Feb. 1968, pages 34–40). Thereby an important role is played by the so-called RS flip-flop with the two inlets R (reset) and S (set). The two inlets may not simultaneously be provided with a "1," since otherwise the state of the sweep stage according to this invention, which is described in the following, does not require this limitation, as opposed to this, but it produces inphase-opposed output signals in each case. In the state R=1, S=1, the inlet R will prevail. Although the so-called MN flip-flop has been previously proposed for a sweep stage with such a function, Wiss. Ber. [Science Report] AEG-Telefunken 41 (1968) we would like to keep the name RS sweep stage for the time being, in the following.

It is true that a subdivision of the sweep stages according to their logical behavior offers an essential aid to the user when working out logic plans, but he will be interested to the same degree in their dynamic behavior since higher and higher processing speeds are desired in the field of data processing.

With regard to the dynamic behavior of sweep stages, one must differentiate between the transit time $d$ (delay time) which is needed by an input signal to have an effect on the outputs and the duration $b$ (pulse width) which an input signal must have so that it can have an effect on the internal regenerative coupling also so that it will be stored. It is common practice to state these two periods of time with sweep stages, which are formed of gates, in full multiples of the gate transit time $\tau$.

SUMMARY OF THE INVENTION

Asynchronous, sweep circuits, i.e. sweep circuits which are not controlled by a pulse timing, may be constructed according to FIGS. 1*a* through 1*c* of this application of two gates which are oppositely regeneratively coupled, whereby it must be taken for granted that at least one of the two gates of the combination has a signal amplification, respectively. Thereby only three different possibilities exist:

a. two NAND gates (FIG. l*a*)
b. two NOR gates (FIG. l*b*)
c. one OR and one AND gate (FIG. l*c*).

All three combinations need adjusting signals, i.e. set or reset signals the duration of which is at least two gate transit times. A first step for the reduction of the necessary duration of the adjusting signals and the signal transit time in the sweep stage is thus the use of gates with as short as possible gate transit times.

Here a circuit technique offers itself with transistors which are not guided into the range of saturation. Such circuits are known as ECL circuits. Their basic form is an emitter-coupled transistor switch (differential amplifier) with two transistors, whereby the input signal is guided directly to the basis of one of the transistors (the directly controlled one), and the bases of the other (indirectly controlled) transistor is held at a fixed auxiliary potential. The emitters of the two transistors are coupled jointly to a device which keeps the current constant, and to one of the poles of the operation voltage source. This device is often replaced by means of a resistance, the magnitude of which is as large as the magnitude of the collector resistances.

A further increase of the operational speed of the sweep stage results if the necessary duration of the adjusting signals to a gate transit time is shortened. This is only possible with asynchronous sweep stages if one of the gates, which are present according to FIGS. 1*a* through l*c*, is replaced by means of a so-called wired gate function such as wired AND or wired OR. Only these two functions are possible because NAND and NOR gates have to receive an inverter which cannot be constructed only with passive (static) construction elements (which necessarily includes the wired gate function). Since a RS sweep stage consists only of the gate combinations (*a*) through (*c*) which have been stated before (FIGS. l*a* through l*c*), it can be directly concluded that only in the combination of FIG. l*c* a gate is to be replaced by means of a wired gate function. Both possibilities which result from this —replacement of the AND gate or replacement of the OR gate—lead to sweep stages with which a regenerative coupling is effected only via a gate and thus one of the adjusting pulses must be applied only for the duration of one gate transit time.

Both circuits need at least two gate transit times for the other adjusting signals. This is due to the fact that an auxiliary gate must be provided in the input branch in which the gate has been replaced by means of the respectively wired gate function, since it cannot generally be taken for granted that the output of the preceding linkage circuit in which this adjusting signal is produced, is suitable for a wired gate function. However, the auxiliary gate can simultaneously be used to compose the respective adjusting signal therewith of partial signals.

This invention therefore has as its primary object to provide an asynchronous RS sweep stage in ECL technique with short adjusting time and short transit time, in which the duration of only one gate transit time is sufficient, at least for the setting pulse. The sweep stage is furthermore to be embodied in a way that—as opposed to the usual definition of the RS sweep stage—inphase-opposed signals are delivered by both of its outputs even if a "1" is applied to the two outputs R and S.

According to this invention the above object is realized through the facts that a first emitter-coupled current switch is provided with a transistor which is controlled by means of the reset signal R and an indirectly controlled transistor with a collector which is connected with an emitter follower which is acting onto a clamp for the inverted output signal $\overline{Q}$, and with a reference potential via a collector resistance, that a second, emitter-coupled current switch is provided with an indirectly controlled transistor, the collector of which, together with the collector of the directly controlled transistor of the first current switch, is connected, via a resistance and a via a diode which is switched into its conduction direction, with the reference potential and with an emitter follower which forms the output stage for the outlet signal Q and with two directly controlled transistors which are connected parallel with regard to their collector-emitter paths, whereby the setting signal S is applied to the base of one of the transistors, and the base of the other transistor is connected with the emitter of the transistor which forms the output stage for the output signal Q, that the collectors of the parallel-connected transistors are connected with the reference potential and with a further emitter follower via a joint collector resistance, which emitter follower also acts onto the clamp for the inverted output signal $\overline{Q}$ for the formation of a wired OR function.

The invention will be best understood from the following detailed description taken in conjunction with the accompanying drawings, in which:

FIGS. l*a*–l*c* are schematic diagrams of asynchronous sweep circuits;

DESCRIPTION OF THE PREFERRED EMBODIMENTS

The RS sweep stage according to FIG. 2 contains two of the emitter-coupled transistor switches which have been mentioned hereinabove. Since it is the function of these switches to switch over a current which is at least nearly constant, from one collector to the other, we may correctly speak about an emitter-coupled current switch.

The first current switch which comprises the transistors T1 and T2, is controlled by the reset signal R. The base of a transistor T3 which is operated as emitter follower is connected with the collector resistance W1 at the collector of the indirectly controlled transistor T2. Its emitter is connected with the clamp $\overline{Q}$ for the inverted output signal $\overline{Q}$ of the sweep stage. The output signal $\overline{Q}$, however, is not only determined by the respective circuit state of the transistor T3; the signal which is generated by the transistor T4, which is also operated as an emitter follower, is participating in the same manner in the formation of the output signal $\overline{Q}$. The partial signals are linked by means of an OR function (wired OR).

The collector of the directly controlled transistor T1 of the first current switch is connected directly with the collector of the indirectly controlled transistor T5 of a second current switch. Both transistors have only one joint collector resistance W2, which has a diode D connected parallel in the current passage direction. As it is known, this is to have the effect that the voltage drop at the resistance W2 remains at least nearly constant, independent of the fact whether only one of the two transistors T1 or T5 is conductive or whether both transistors contain current flow.

A third emitter follower comprising the transistor T8 is connected at the connection point of the collectors of the two last-mentioned transistors, which emitter follower supplies the uninverted output signal Q to the clamp Q. From here, a regenerative line leads to the base of one of two directly controlled transistors T6, T7 of the second current switch, which transistors are connected in parallel with regard to their collector-emitter paths. The second transistor T7 of this couple is controlled by the set signal S. The collectors of the parallel-connected transistors T6 and T7 which are connected to the reference potential UO via the collector resistance W3, are connected finally with the base of the transistor T4 which has been mentioned hereinbefore, in an emitter-follower circuit.

Figure 1A:
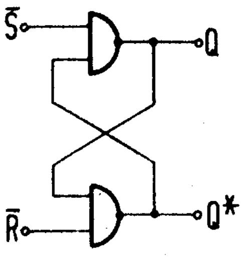
Figure 1B:
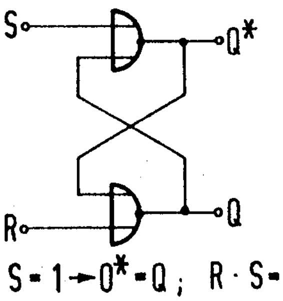
Figure 1C:
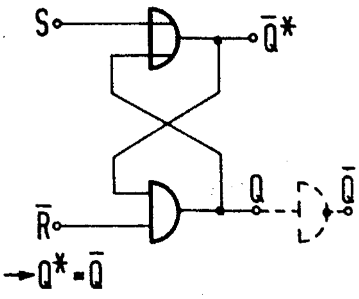
Figure 2:
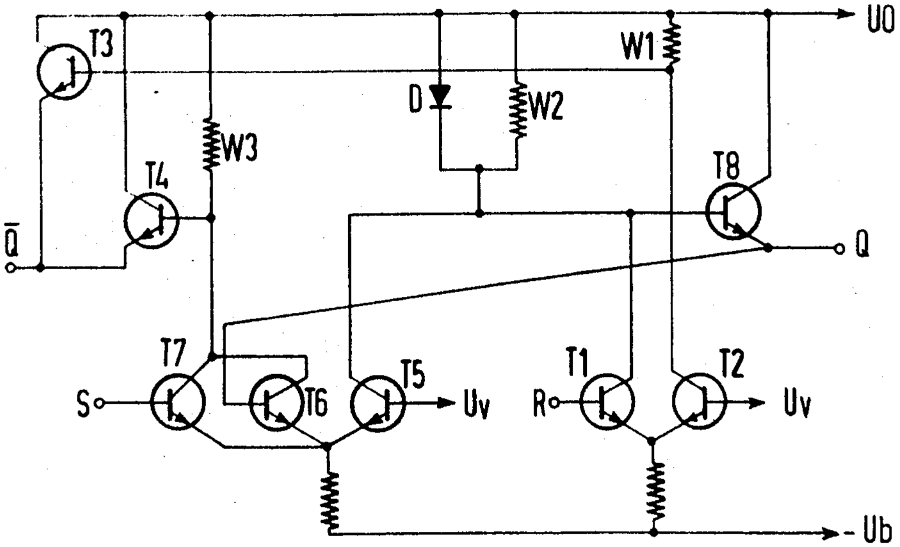
FIG. 2 is a circuit diagram of a sample embodiment according to this invention.
Figure 3:
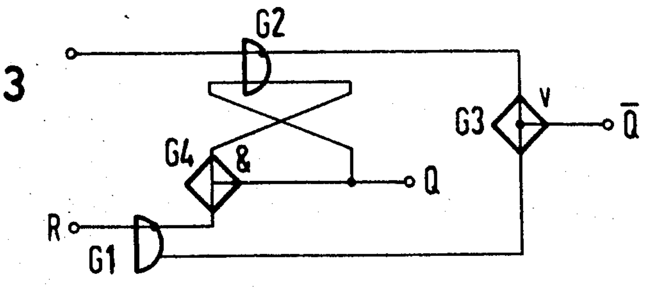
FIG. 3 is the equivalent-circuit diagram for the sample embodiment according to FIG. 2.

The equivalent-circuit diagram which is shown in FIG. 3, gives a better overall view over the RS sweep stage according to FIG. 2. In FIG. 3 the auxiliary gate G1 corresponds to the first emitter-coupled current switch T1, T2 in FIG. 2, and the OR-NOR gate G2 to the second emitter-coupled current switch T5, T6, and T7. The symbol which has been named G3 means the wired OR function (Phantom OR gate) which, as it has been mentioned hereinbefore, is embodied by means of the connection of the emitters of the transistors T3 and T4 according to FIG. 2. The inverted output signal of the auxiliary gate G1 and the uninverted output signal of the OR-NOR gate G2 are combined via the wired AND function G4 on the output of the clamp Q. From here, a regenerative path leads again to an input of the gate G2. The wired AND function G4 is formed in a manner which is known in itself, see data sheet MC 1019, by means of the connection of the collectors of the transistors T1 and T5. As can easily be seen from FIG. 2, the higher signal level which corresponds to the binary value is applied to the connection point of the collectors and thus also to the output clamp when neither the transistor T1 nor the transistor T5 contain current flow. From this, one of the characteristic equations of the sweep stage can be derived directly:

$$Q^{n+1}=\overline{R^n}(S^n+Q^n),$$

whereby the superscripts $n$ and $n+1$ state the signal states at the time $t^n$ in a common way or the resulting signal states at the time $t^n+1$. Correspondingly, there results for the second sweep state outlet:

$$\overline{Q^{n+1}}=R^n+\overline{S^n+Q^n}=\overline{\overline{R^n}(S^n+Q^n)}$$

It can furthermore be taken from the equivalent-circuit diagram according to FIG. 3 that the adjusting signals S and R, respectively, have only to pass one transit time containing gate to be able to have an effect at the sweep stage outlets. Correspondingly, the minimum required duration of the setting signal S must only be one gate transit time, since the output Q is connected directly with an input of the gate G2 which is equivalent to the set input S. For the duration of the reset signal R, however, two gate transit times are necessary since this signal has to pass both gates G1 and G2 to have a lasting effect.

The minimum required duration for the reset pulses R of two gate transit times is still a certain drawback of the embodiment of the sweep stage according to FIG. 2. A further disadvantage is caused since the voltage drop due to the parallel switching of the diode D and the resistance W2 does not remain entirely constant, neither with single nor with double current, in spite of the effect of the diode. A small shifting of the static output levels thus cannot be prevented, so that the static interference becomes a little smaller than with usual gates. Due to the slowness of the diode, short interfering pulses can also come about when the current in the diode changes due to switching processes.

Figure 4:
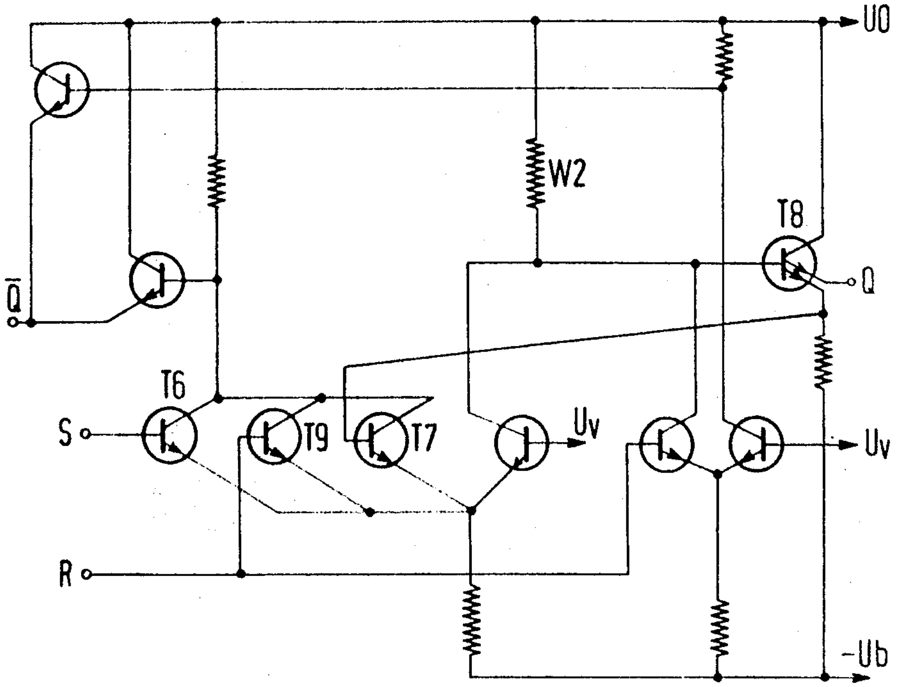
FIG. 4 is another circuit diagram of a further sample embodiment.

The above-mentioned drawbacks are prevented according to this invention with a further embodiment of a RS sweep stage as illustrated in FIG. 4. This sample embodiment resembles to a large degree the sample embodiment according to FIG. 2, so that a general description is not necessary. The essential difference resides in switching a further transistor T9 parallel to the directly controlled transistors T6 and T7 of the second current switch. This transistor T9 is also controlled by means of the reset signal R. Due to this it is provided that the double current, which belongs to the transistors T1 and T5 together, will never flow through the collector resistance W2. The diode which is provided with the sample embodiment according to FIG. 2 can also be eliminated in the embodiment according to FIG. 4. The simultaneous control of the transistors T1 and T9 by means of the reset signal results in the further advantage that the minimum required duration for the reset pulse now also must only be one gate transit time. In this embodiment the transistor T8 may be advantageously provided as a dual emitter device for deriving the output signal Q.

Figure 5:
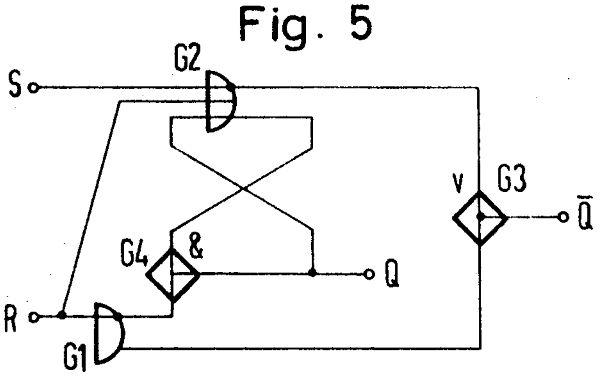
FIG. 5 is the equivalent-circuit diagram for the sample embodiment according to FIG. 4.

The advantageous provision of the double control of the sweep stage according to FIG. 4 can best be seen from the equivalent-circuit diagram FIG. 5 In the state R=1, the sweep stage output Q lies on zero, independent of the state of the OR gate G2. Thus, it does not disturb either if the reset signal R puts the gate G2 onto "1" or holds it there. But hereby the precircumstance has to be taken into account that both gates switch as equal as possible. If, for instance, the gate G1 switches faster than the gate G2, a positive interfering pulse can come about at the end of a reset pulse R which sweeps back the sweep stage into the state Q=1. This case thus is prevented by means of a suitable design and dimensioning of the circuit.

Many changes and modifications may be made in the invention by one skilled in the art without departing from the spirit and scope of the invention, and it is to be understood that I wish to include within the patent warranted hereon, all such changes and modifications as may reasonably and properly be included within the scope of my contribution to the art.

I claim:

1. An asynchronous emitter-coupled sweep stage comprising a first emitter-coupled current switch including first and second transistors, and a third transistor, first, second and third resistances, a diode, a fourth transistor, and a second emitter-coupled current switch including fifth, sixth and seventh transistors, an eighth transistor, all of said transistors including a base, an emitter and a collector, the base of said first transistor adapted to receive a reset signal, the base of said second transistor connected to a first reference potential, the emitters of said first and second transistors coupled to a second reference potential, said third transistor forming an emitter follower and having its base connected to the collector of said second transistor and jointly therewith by way of said first resistance to a third reference potential, the emitter of said third transistor for providing an inverted form of the output signal, said fourth transistor forming an emitter follower with its collector connected to said third reference potential and its base connected to the collectors of said first and fifth transistors and by way of said second resistance and said diode in parallel to the third reference potential, the emitter of said fourth transistor for providing the output signal and connected to the base of said sixth transistor, the emitters of said fifth, sixth and seventh transistors connected to the second reference potential and the collectors of said sixth and seventh transistors connected to the base of the eighth transistor and by way of said third resistance to the third reference potential, the emitters and collectors of said third and eighth transistors being respectively connected and said collectors connected to said third reference potential, the base of said seventh transistor adapted to receive a set signal and the base of said fifth transistor connected to the first reference potential whereby the inputs to the bases of said third and eighth transistors from a wired OR function to effect provision of the inverted output signal.

2. An asynchronous sweep stage according to claim 1, comprising a ninth transistor having an emitter, a collector and a base, the base connected to the base of said first transistor and also adapted to receive the reset signal, the emitter and collector connected in common with the respective emitters and collectors of said sixth and seventh transistors of said second current switch to obviate the necessity for said diode.

3. An asynchronous sweep stage according to claim 2, wherein said emitter of said fourth transistor includes a first and second emitter element, the first emitter element having said connection to said sixth transistor and said second emitter element providing said output signal.